United States Patent
Schmit et al.

(10) Patent No.: US 10,455,211 B2
(45) Date of Patent: Oct. 22, 2019

(54) METHOD AND APPARATUS OF IMAGE PROCESSING

(71) Applicant: Advanced Micro Devices, Inc., Sunnyvale, CA (US)

(72) Inventors: Michael L. Schmit, Sunnyvale, CA (US); Radhakrishna Giduthuri, Sunnyvale, CA (US); Kiriti Nagesh Gowda, Sunnyvale, CA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 0 days.

(21) Appl. No.: 15/605,474

(22) Filed: May 25, 2017

(65) Prior Publication Data

US 2018/0343430 A1    Nov. 29, 2018

(51) Int. Cl.
| | |
|---|---|
| *G09G 5/00* | (2006.01) |
| *H04N 13/117* | (2018.01) |
| *G06T 3/40* | (2006.01) |
| *H04N 5/225* | (2006.01) |
| *H04N 13/204* | (2018.01) |
| *H04N 5/232* | (2006.01) |
| *H04N 5/247* | (2006.01) |
| *H04N 13/243* | (2018.01) |

(52) U.S. Cl.
CPC ......... *H04N 13/117* (2018.05); *G06T 3/4038* (2013.01); *H04N 5/2254* (2013.01); *H04N 5/2258* (2013.01); *H04N 13/204* (2018.05); *H04N 5/23238* (2013.01); *H04N 5/247* (2013.01); *H04N 13/243* (2018.05)

(58) Field of Classification Search
CPC .......................... G06T 3/4038; H04N 5/23238
USPC .......................................................... 345/418
See application file for complete search history.

(56) References Cited

U.S. PATENT DOCUMENTS

| | | | |
|---|---|---|---|
| 7,386,188 B2* | 6/2008 | Peterson | G06T 3/4038 345/629 |
| 7,646,932 B1* | 1/2010 | Peterson | G06T 3/4038 345/629 |
| 8,391,641 B2* | 3/2013 | Porter | G03B 37/04 382/284 |
| 2010/0150444 A1* | 6/2010 | Kim | G06T 7/11 382/180 |
| 2014/0118364 A1* | 5/2014 | Hakura | G06T 11/40 345/505 |
| 2016/0323561 A1* | 11/2016 | Jin | H04N 5/23267 |

OTHER PUBLICATIONS

Xiong Y, Pulli K. Fast image labeling for creating high-resolution panoramic images on mobile devices. InMultimedia, 2009. ISM'09. 11th IEEE International Symposium on Dec. 14, 2009 (pp. 369-376). IEEE.*

(Continued)

*Primary Examiner* — Weiming He
(74) *Attorney, Agent, or Firm* — Volpe and Koenig, P.C.

(57) ABSTRACT

A method and apparatus of precomputing includes capturing a first image by a first image capturing device. An image space for the first image is defined and pixels in the image space are analyzed for validity. Valid pixels are stored as valid pixel groups and the valid pixel groups are processed.

20 Claims, 9 Drawing Sheets

(56) References Cited

OTHER PUBLICATIONS

Xiong Y, Pulli K. Sequential image stitching for mobile panoramas. InInformation, Communications and Signal Processing, 2009. ICICS 2009. 7th International Conference on Dec. 8, 2009 (pp. 1-5). IEEE.*

Rankov V, Locke RJ, Edens RJ, Barber PR, Vojnovic B. An algorithm for image stitching and blending. InThree-Dimensional and Multidimensional Microscopy: Image Acquisition and Processing XII Mar. 24, 2005 (vol. 5701, pp. 190-200). International Society for Optics and Photonics.*

* cited by examiner

METHOD AND APPARATUS OF IMAGE PROCESSING

BACKGROUND

Virtual reality (VR) has introduced a new level of entertainment experience for users of video games and those who desire an enhanced video or graphic experience. Where once, an individual gamer or viewer would view only a flat screen image, VR allows a 360 degree view immersive experience that allows the viewer or gamer to see completely around, and above and below his or her position.

In order to accomplish this, cameras are utilized to take images and/or video in multiple directions from a common point to capture multiple views that an observer in that position would see depending on the direction he or she is facing. Often, multiple cameras are disposed on a camera rig to capture images and/or video from the multiple individual cameras' perspectives. Those images or video captured in those views are then processed to create a virtual 360 degree view around the observer.

This processing is time consuming, and when performed on pixels that are not needed for a particular image, can cause delays in processing, particularly with regard to real-time storage and rendering of the 360 degree view.

BRIEF DESCRIPTION OF THE DRAWINGS

A more detailed understanding can be had from the following description, given by way of example in conjunction with the accompanying drawings wherein.

DETAILED DESCRIPTION

During the capturing of 360 degree image views by a camera for rendering in a virtual reality (VR) environment, there are several operations that are performed in order to properly render the image. For example, correction for lens distortion is performed where a captured image that is captured by a fisheye lens is warped into a flat space. Image contrast adjustment is performed due to the fact that multiple cameras include different lens settings as well as may be positioned such that the lens of one camera is pointing in a direction where there may be sunlight while the other is pointed to shade, thus causing a difference in luminance between similar objects captured by those lenses. Seam finding is performed to find the best location for the seams in overlapping areas between adjacent images to stitch the images together to form a combined image. Once the seam finding is performed, blending across the seams is performed to render the seam as invisible as possible to a viewer. Blending across lenses is performed to account for other differences between the images that are stitched together. All of these operations are performed to provide a more immersive environment where a viewer experiences an environment that surrounds him or her.

There are conventional techniques for performing each of the aforementioned operations, and therefore the specifics of each operation are not described in further detail. However, the computations required for the performance of the above operations are extensive and potentially very time consuming. Accordingly, described herein is a method and apparatus for image processing utilizing precomputing so that precious resources are not utilized to perform computations for the operations above on unneeded data.

A method of image processing is disclosed. The method includes capturing a first image by a first image capturing device. An image space for the first image is defined and pixels in the image space are analyzed for validity. Groups of valid pixels are stored and the groups of valid pixels are processed.

An apparatus is disclosed. The apparatus includes a computing device in communication with one or more image capturing devices. The computing device receives a first image captured by a first image capturing device, and defines an image space for the first image. The computing device analyzes pixels in the image space for validity, stores valid pixels as a valid pixel group, and processes the stored pixel group.

A non-transitory computer-readable medium having instructions recorded thereon, that when executed by a computing device, cause the computing device to perform operations is disclosed. The operations include receiving a first image captured by a first image capturing device of a plurality of image capturing devices. An image space for the first image is defined, and pixels in the image space are analyzed for validity. Valid pixels are stored as a valid pixel group, and the stored pixel groups are processed.

Figure 1:
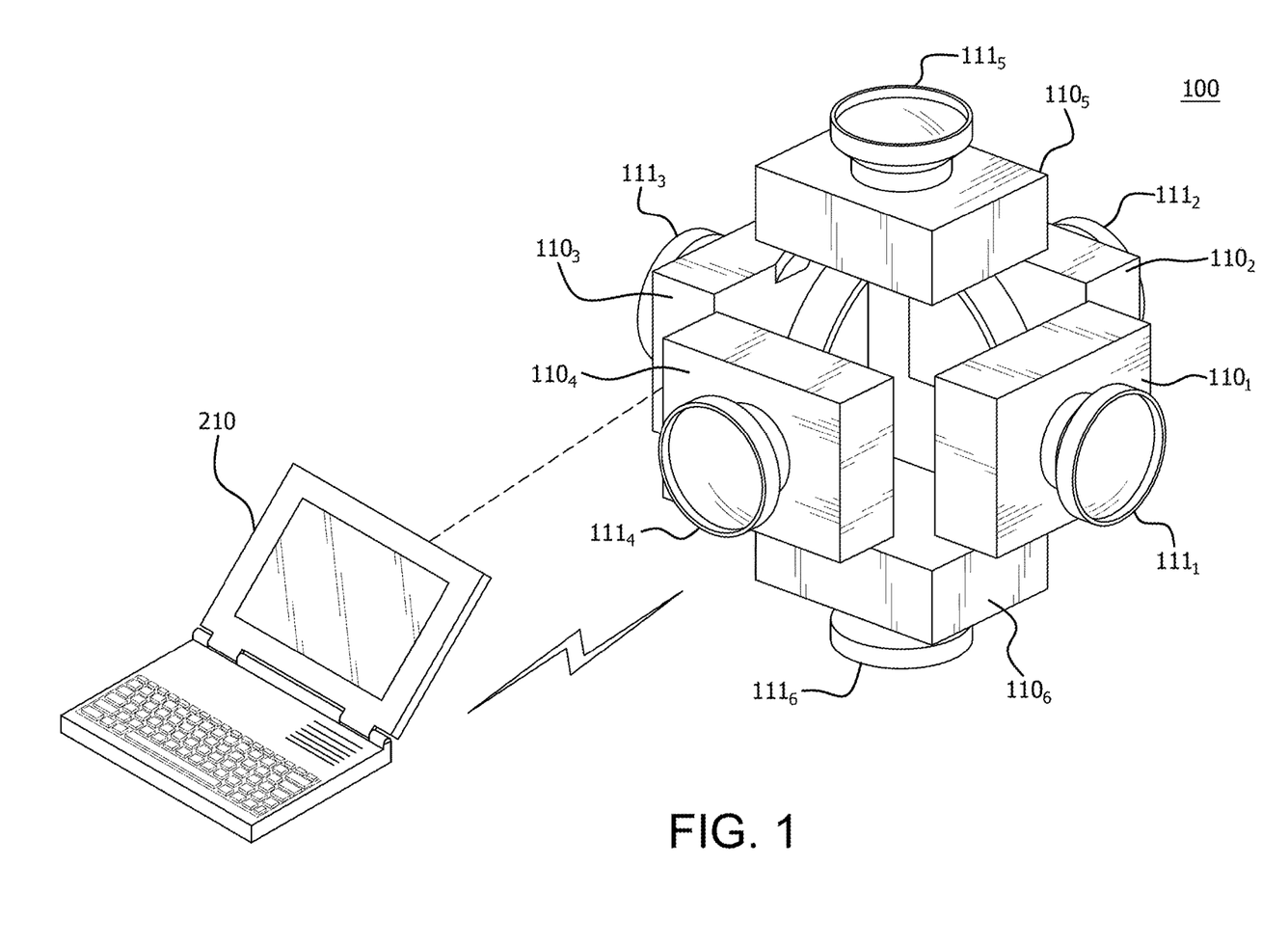
FIG. 1 is a diagram of an example 360 degree camera rig for capturing images and/or video.

FIG. 1 is a diagram of an example 360 degree camera rig 100 for capturing images and/or video. The camera rig 100 includes a plurality of devices 110, (e.g., image capturing devices such as cameras), for capturing the images/video, (designated $110_1$, $110_2$, $110_3$, $110_4$, $110_5$, and $110_6$). Although the components of each device 110 are described in further detail below, it is noted in FIG. 1 that each device 110 includes a respective lens 111, (designated $111_1$, $111_2$, $111_3$, $111_4$, $111_5$, and $111_6$). As shown in FIG. 1, each lens 111 is pointed in a direction different from the lenses 111 from other devices 110 on the camera rig 100. That is, devices $110_1$-$110_4$ are situated substantially planar to one another and each face a direction substantially 90 degrees from one another. Device $110_5$ is pointed in a perpendicular direction, (e.g., up), with relation to the devices $110_1$-$110_4$ and device $110_6$ is pointed in an opposite direction, (e.g., down), with relation to device $110_5$. Accordingly, the six devices $110_1$-$110_6$ are situated around the camera rig 100 to capture images or video in substantially a 360 degree field of view. Although six devices 110 are shown in FIG. 1, it is noted that more or less devices 110 can be utilized on the camera rig 100. It should be noted that although a 360 degree field of view is referenced as an example field of view, any degree field of view could be utilized depending on the application.

Figure 2A:
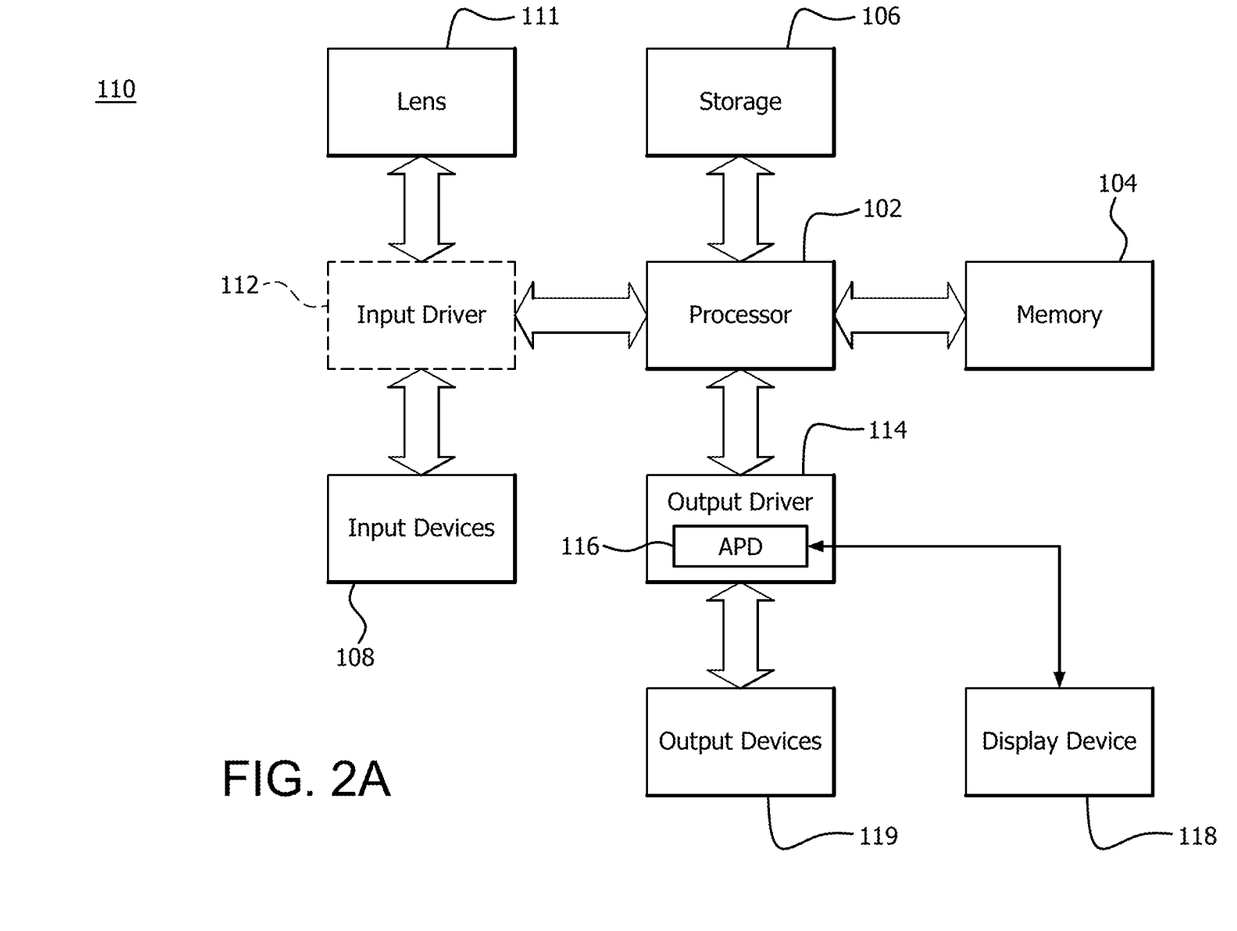
FIG. 2A is a block diagram of an example device depicted in FIG. 1 in which one or more features of the disclosure can be implemented.

FIG. 2A is a block diagram of one of the example devices 110 depicted in FIG. 1 in which one or more features of the disclosure can be implemented. More detail regarding the implementation of a method of precomputing as it relates to FIG. 2A is described in further detail below. Although the device 110 has been described as an image capturing device, (e.g., camera), it is noted that the device 110 can include, for example, a computer, a gaming device, a handheld device, a set-top box, a television, a mobile phone, or a tablet computer. For purposes of example herein, the example device 110 is described as an image capturing device 110, which for example is a camera.

Accordingly, the device 110 includes a processor 102, a memory 104, a storage 106, one or more input devices 108, a lens 111, and one or more output devices 119. The device 110 can also optionally include an input driver 112 and an output driver 114. It is understood that the device 110 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 119 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 the input devices 108, and the lens 111, and permits the processor 102 to receive input from the input devices 108 and the lens 111. The output driver 114 communicates with the processor 102 and the output devices 110, and permits the processor 102 to send output to the output devices 119. It is noted that the input driver 112 and the output driver 114 are optional components, and that the device 110 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2B:
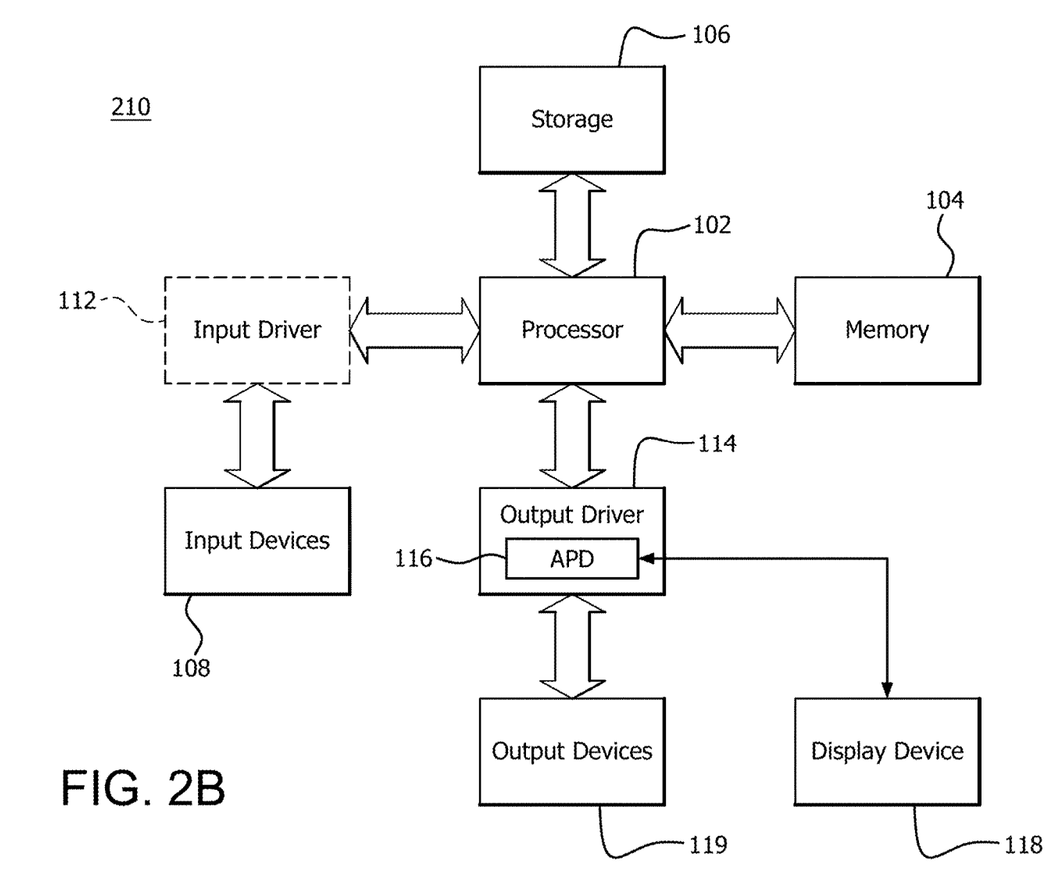
FIG. 2B is a block diagram of an example system in which one or more features of the disclosure can be implemented.

FIG. 2B is a block diagram of an example system 210 in which one or more features of the disclosure can be implemented. The system 210 includes substantially similar components to the device 110, except for the lens 111. The system 210 can include can include, for example, a computer, a gaming device, a handheld device, a set-top box, a television, a mobile phone, or a tablet computer. The system 210 is in communication with each of the devices 110 depicted in FIG. 1 and can provide control programming to the devices 110 and receive data from the devices 110. More detail regarding the implementation of a method of precomputing as it relates to FIG. 2B is described in further detail below.

Figure 3:
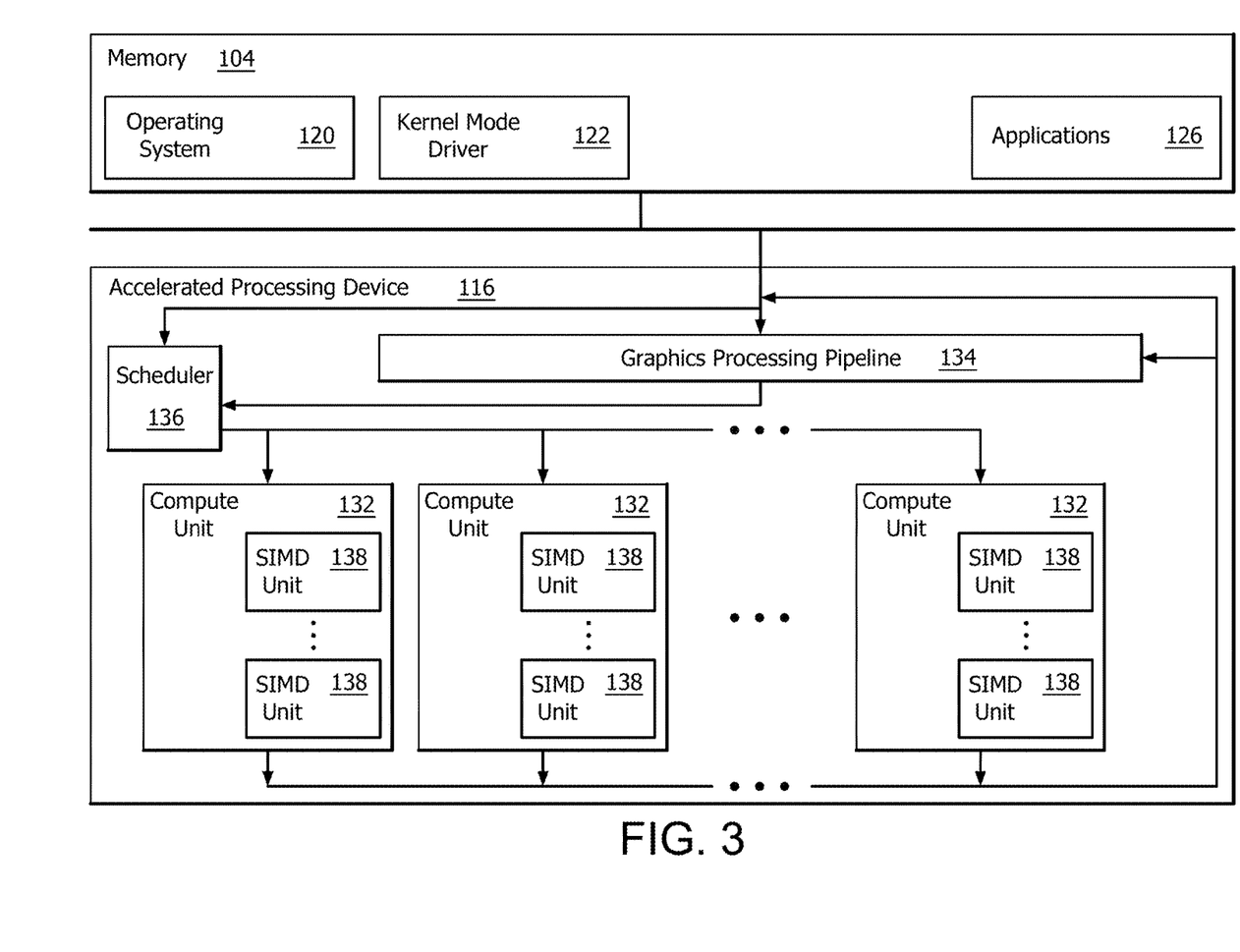
FIG. 3 is a block diagram of the example device of FIG. 2A and example system of FIG. 2B, illustrating additional detail.

FIG. 3 is a block diagram of the device 110 and system 210, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 can also include a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

As mentioned above, each of the devices 110 captures an image in a different direction in accordance with its associated lens 111. Accordingly, device $110_1$ captures a different image from device $110_2$, and so on. Accordingly, the pixels in an image from a region that one device 110, (e.g., $110_2$), is capturing are typically not important to another device, such as device $110_1$. However, between adjacent devices 110, there is an overlap between images captured. That is, the image captured by device $110_1$ includes an area of overlap with the image captured by devices $110_2$-$110_6$. For this reason, device $110_1$ would waste resources performing any of the operations described above for pixels that are part of an image that is captured by device $110_2$-$110_6$, for example. Although the specifics of warping images are not described herein, each image captured by each device 110 is eventually warped into a spherical space for processing and computing seams between images from the perspective of an observer, (e.g., an observer who would be at the center of the rig 100). Accordingly, that observer experiences a full 360 degree vision experience as if he or she is looking up or down, or left or right, without seeing where the image of one camera ends and the image from another camera begins. For example, the images can be represented by projecting them into a spherical space utilizing conventional equirectangular or cube projections, (e.g., in FIG. 5 below).

Figure 4A:
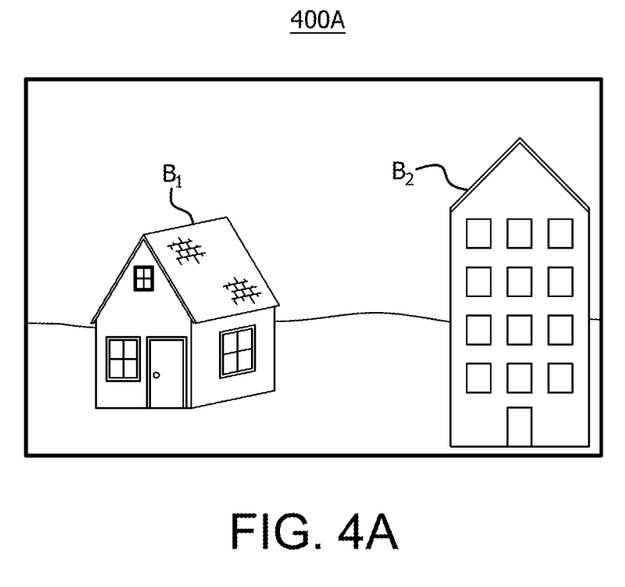
FIG. 4A is an example first image captured from a first device of the camera rig depicted in FIG. 1.

FIG. 4A is an example first image 400A captured from a first device of the camera rig depicted in FIG. 1. For purposes of example, the example first image 400A is depicted as being captured from a first device, (e.g., $110_1$), of the camera rig. The image 400A includes a number of example objects in the field of view of the lens $111_1$, which are captured in image 400A. For example, image 400A depicts a building B1 and building B2 in the field of view captured by lens $111_1$.

Figure 4B:
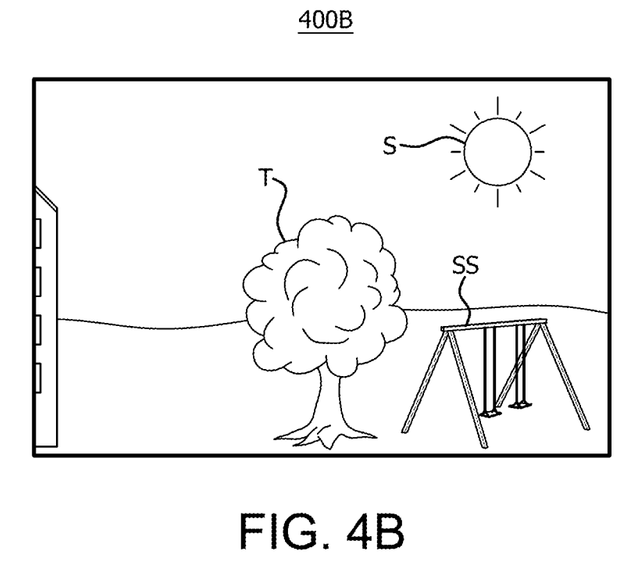
FIG. 4B is an example second image captured from a second device adjacent to the first device of the camera rig depicted in FIG. 1.

FIG. 4B is an example second image 400B captured from a second device adjacent to the first device 110 of the camera rig depicted in FIG. 1. Using the example depicted in FIG. 4A, where the first device is device $110_1$, and the second device 110 is device $110_4$. That is, the image 400B is an example image that is captured by the lens $111_4$ of device $110_4$ that is adjacent and to the right of device $110_1$. As shown in FIG. 4B, image 400B includes a number of objects captured by the lens $111_4$, such as a portion of the building B2, a tree T, the sun S, and a swingset SS.

Figure 4C:
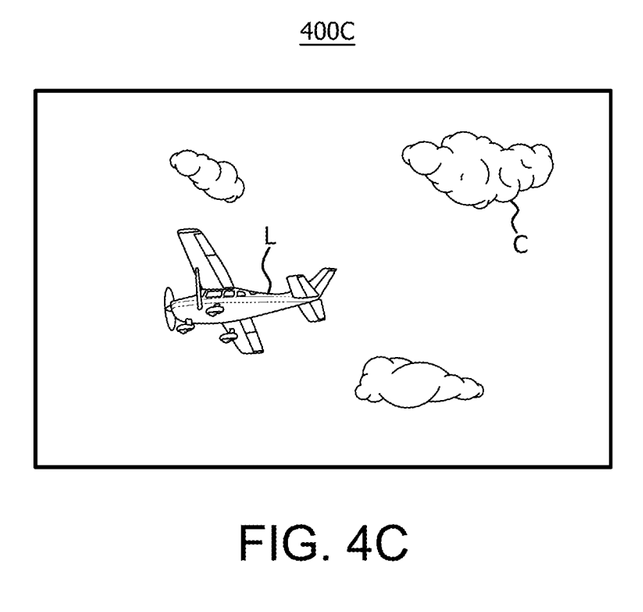
FIG. 4C is an example third image captured from a third device adjacent to the first device of the camera rig depicted in FIG. 1.

FIG. 4C is an example third image 400C captured from a third device adjacent to the first device of the camera rig depicted in FIG. 1. In this example, the image 400C is captured by device the lens $111_5$ of device $110_5$ that is adjacent and above device $110_1$. As shown in FIG. 4C, image 400C includes a number of objects captured by the lens $111_5$ of device $110_5$, including an airplane L and a cloud C.

Figure 4D:
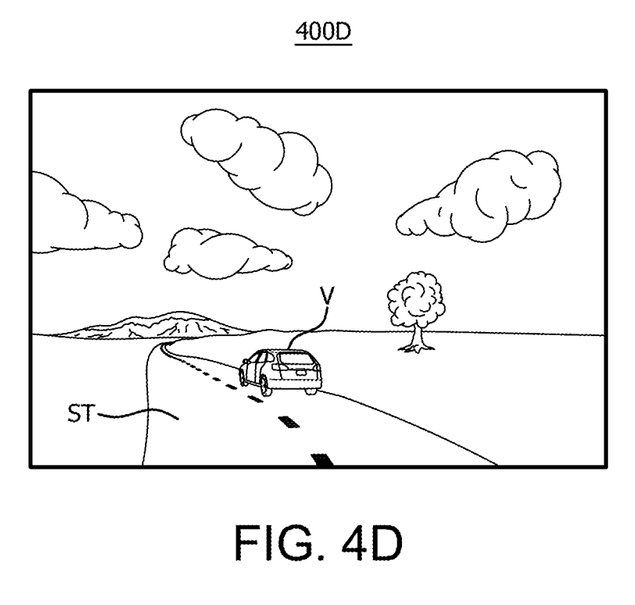
FIG. 4D is an example fourth image captured from a fourth device adjacent to the first device of the camera rig depicted in FIG. 1.

FIG. 4D is an example fourth image 400D captured from a fourth device adjacent to the first device of the camera rig depicted in FIG. 1. In this example, the image 400D is captured by device the lens $111_2$ of device $110_2$ that is adjacent and to the left of device $110_1$. As shown in FIG. 4D, image 400D includes a number of objects captured by the lens $111_2$ of device $110_2$, including a street ST and a vehicle V on the street.

Figure 4E:
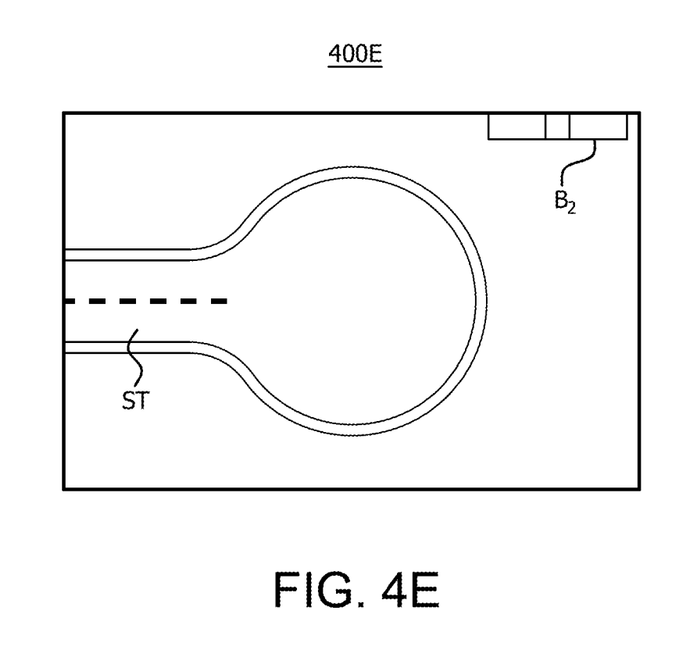
FIG. 4E is an example fifth image captured from a fifth device adjacent to the first device of the camera rig depicted in FIG. 1.

FIG. 4E is an example fifth image 400E captured from a fifth device adjacent to the first device of the camera rig depicted in FIG. 1. In this example, the image 400E is captured by device the lens $111_6$ of device $110_6$ that is adjacent and below device $110_6$. As shown in FIG. 4E, image 400E includes a number of objects captured by the lens $111_6$ of device $110_6$, including an additional portion of the street ST and the lower portion of the building B2 also captured in image 400A.

Figure 5:
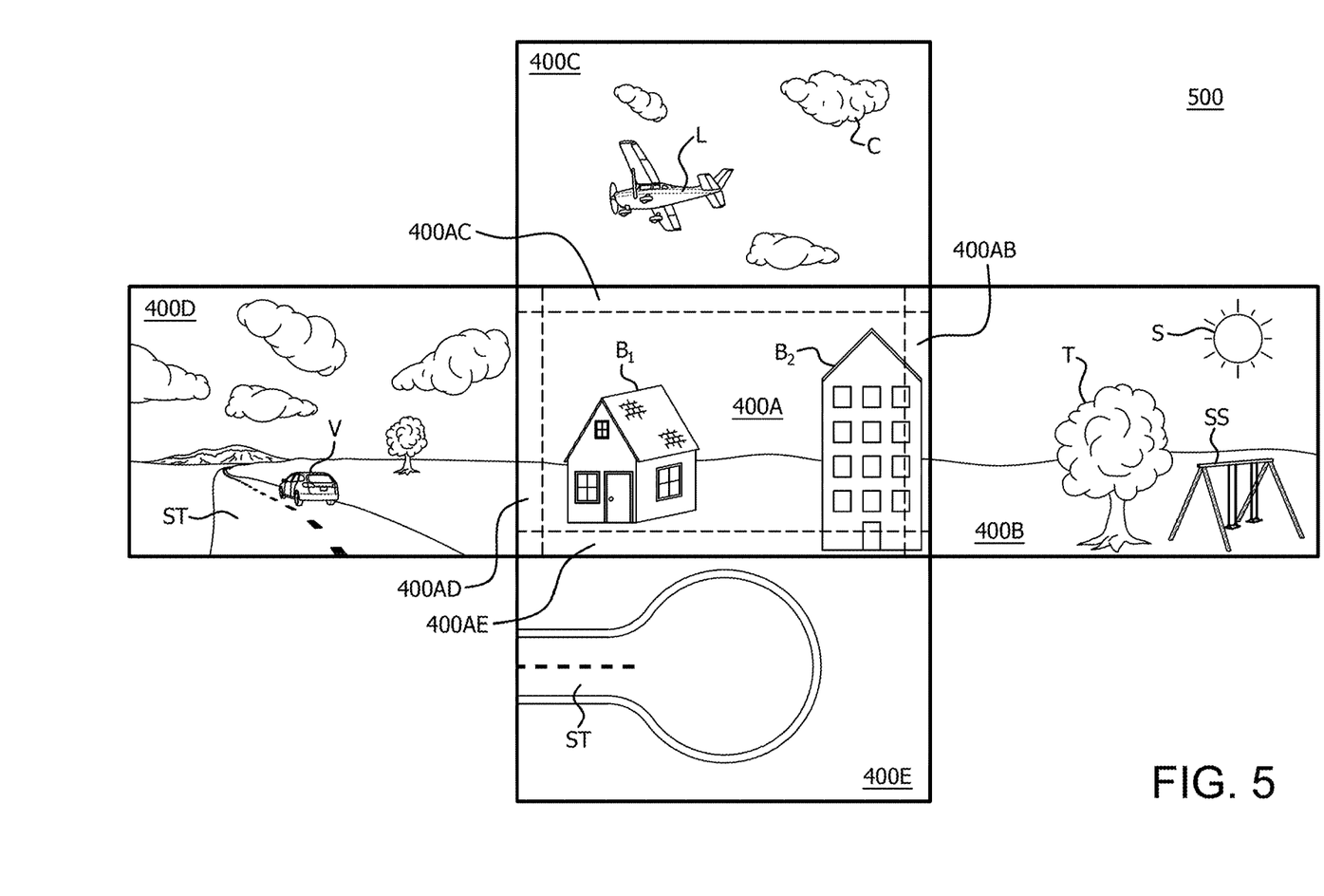
FIG. 5 is an example depiction of the images of FIGS. 4A-4E projected into an image space.

FIG. 5 is an example depiction 500 of the images of FIGS. 4A-4E projected into an image space. As mentioned above, the images in depiction 500 can be projected as a conventional equirectangular image projection of a 360 degree image space, where image 400A is effectively in front of a viewer, image 400B would be to the viewer's right, image 400C would be above the viewer, image 400D would be to the left of the viewer, and image 400D would be beneath the viewer. Although depicted as generally flat images in depiction 500 for purposes of example and description of the method below, it should be noted that the images are projections into a 3 dimensional, 360 degree image space, and can be warped so that they generally surround a viewer looking directly at image 400A.

Accordingly, as shown in image 400A as depicted in FIG. 5 are those objects that are in the view of lens $111_1$ of the first device $110_1$, such as buildings $B_1$ and $B_2$. The pixels for the objects in images 400B-E depicted in FIG. 5 that are to the right, above, left and below the device $110_1$ are not necessary for the processing of the image that device $110_1$ is capturing for its portion of a 360 view of the total rendering that is displayed to the viewer. Therefore, processing of those pixels is a waste of resources for performing calculations with respect to performing processing for the device $110_1$.

Also depicted in FIG. 5 are overlap areas that include common portions between image 400A and adjacent images 400B-E. These overlap areas exist because the lenses 111 of each of the devices 110 also capture portions of the overall 360 degree rendering that are captured in common with the lenses an adjacent device 110. For example, overlap area 400AB corresponds to an overlap area between image 400A and 400B, overlap area 400AC corresponds to an overlap area between image 400A and 400C, overlap area 400AD corresponds to an overlap area between image 400A and 400D, and overlap area 400AE corresponds to an overlap area between image 400A and 400E. Although there are also overlap areas in the corners of image 400A that overlap more than two images, for example purposes, the overlap areas between only image 400A and each of images 400B, 400C, 400D and 400E are considered herein.

Figure 6:
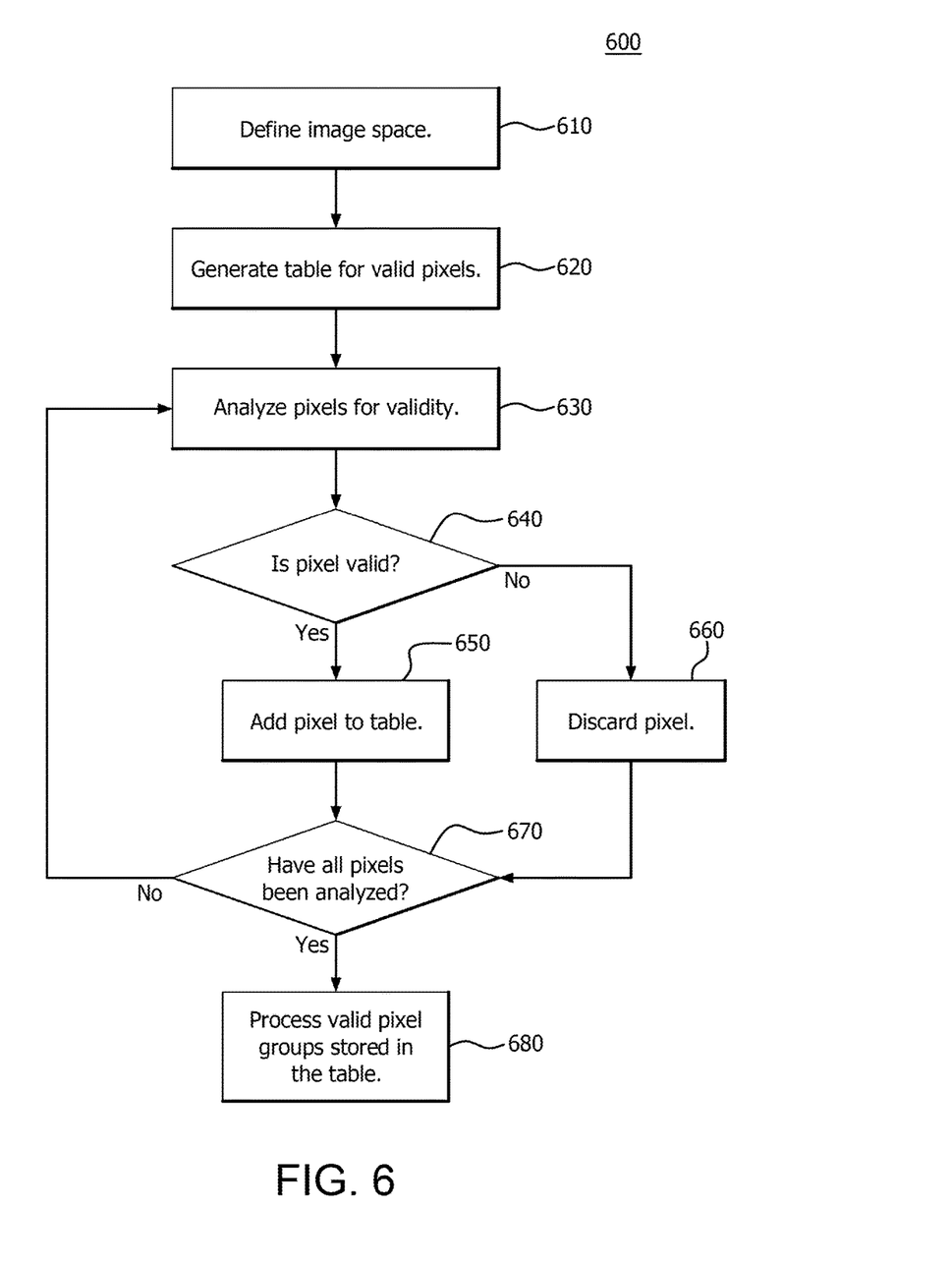
FIG. 6 is a flow diagram of an example method of precomputing.

FIG. 6 is a flow diagram of an example method 600 of precomputing. The precomputing can be performed by the processor 102, for example, and/or a GPU such as APD 116 of either an individual device 110 of FIG. 2A or the system 210 of FIG. 2B based on the given geometry of the camera rig 100 and lenses 111 in addition to user provided parameters/options. As described above, some pixels can only originate from a single device 110 due to the direction of the lens 111 while other pixels for projection into the depiction 500 cannot originate from the single device 110 in question. However, there are pixels that can originate from 2 or more devices 110 since those pixels are in an overlap area, (e.g., 400AB, 400AC, 400AD or 400AE of FIG. 5).

Accordingly, in step 610, an image space is defined in which to perform the precomputing. That is, a mask is generated such that pixels that fall outside of a valid area for a particular device 110 are ignored as not being valid pixels in order to not waste processing resources. For example, referring back to FIG. 5, for device $110_1$, the image space includes that space defined by image 400A, with some modifications as discussed below. Once the image space is defined, a table is generated for storing groups of valid pixels (step 620) for that image space. This table can be stored in the memory 104 by the processor 102 of the device $110_1$ or system 210.

That is, again using device $110_1$ as the example, the boundaries of each overlap area, such as the boundaries of overlap areas 400AB, 400AC, 400AD and 400AE are determined, and then potentially narrowed. For example if an overlap is 128 pixels wide and 512 pixels high, it could be restricted to 100×500 pixels, for example, to prevent a seam from getting too close to the edge of the overlap area. When stitching is performed to combine two adjacent images, it is performed at a seam that is calculated in the overlap area between the two adjacent images, (e.g., image 400A and 400B). In that case, the boundary of the image space for device $110_1$ for precomputing would be smaller than the entire image 400A captured by the lens $111_1$ of the device $110_1$. If the regions of valid pixels are defined as rectangles, the corner points of the rectangles define the boundaries of the image space. Therefore, for purposes of example, the image boundaries for the image to projected into the 3D space by device $110_1$ are the inner rectangle defined by the hashed lines for image 400A as depicted in FIG. 5. However, it should be noted that a particular seam between two adjacent images does not always necessarily follow a straight line path such as depicted in FIG. 5. In those cases, the regions of valid pixels are irregular shapes as opposed to rectangular.

Accordingly, a mask is applied that indicates pixels are only valid for precomputing for a particular device 110 if they are within the boundary defined above for that device 110. Pixels that are outside the boundary are masked out as invalid, even though those pixels may be captured by that device. That is, pixels that are slated to be projected into image space 500 of FIG. 5 that are outside of the boundary area for device $110_1$ are invalid and will not have precomputing, (e.g., processing), performed on them for device $110_1$. Additionally, pixels at the boundary edges, (e.g., on either side of the boundary edge), are considered mirror pixels since that they can be included as valid pixels for more than one device 110, (e.g., device $110_1$ and $110_2$). In those cases, the pixels are effectively mirrored for processing and included in the precomputing for either device 110 capturing them as they are considered valid pixels for either device.

Accordingly, in step 630, each pixel is then analyzed for validity, and if valid (step 640), the pixel is added to the table storing the groups of valid pixels (step 650), for example by adding a pointer to that pixel. If a pixel is found to lie within the boundary area, (defined image space by the applied mask), that pixel is considered valid and added to the group of valid pixels. If invalid, (i.e., the pixel is masked out by the applied mask), the pixel is discarded (step 660). In this manner a work item to process each pixel on the graphics pipeline 134 shown in FIG. 3 is created and can be assembled into workgroups for processing that only contain valid pixel groups.

Utilizing the method 600 of precomputing shown in FIG. 6, groups of valid pixels are stored. Each group may be considered to be a work item to be processed by, for example, the GPU pipeline 134. In one example, 8 consecutive pixels are stored as a work item, but differing sized groups may be used. Therefore, if a group of 8 consecutive pixels has no valid pixels, then that group is discarded and not stored in the table. If there are any valid pixels in the group, (even if there are also invalid pixels), then the group is stored in the table along with a mask of which pixels are valid.

In step 670, it is determined whether all of the pixels that will be projected into the 360 degree image space have been precomputed, (i.e., whether or not all the pixels have been determined to either be valid or invalid in view of the applied mask). If they have not, the method 600 returns to step 630. If they have, the method 600 proceeds to step 680, where the valid pixel groups stored in the table are processed. For example, the workgroups in the table can be sent to the pipeline 134 for parallel processing on compute units 132. In this manner, all work-items and work groups described above are generated for processing on the graphics pipeline 134 by the tables containing valid pixel groups. The workgroups are sent, for example, for image contrasting, correction, blending, or the like as described above.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of precomputing that reduces a number of computations required by a graphics pipeline, comprising:
    capturing a first image of a plurality of images by a first image capturing device of a plurality of image capturing devices;
    capturing a second image of the plurality of images by a second image capturing device of the plurality of image capturing devices;
    defining a first image space for the first image that is a subset of the first image;
    defining a second image space for the second image that is a subset of the second image;
    capturing, by a respective image capturing device of the plurality of image capturing devices, a respective remaining image of each of the remaining plurality of images;
    defining a respective remaining image space for each of the respective remaining images that is a subset of that image;
    determining first valid pixels by analyzing pixels in the first image space for validity for processing of pixels captured by the first image capturing device;
    determining second valid pixels by analyzing pixels in the second image space for validity for processing of pixels captured by the second image capturing device;
    determining respective remaining valid pixels by analyzing pixels in each of the remaining respective image spaces for validity for processing of pixels captured by the respective image capturing devices;
    storing the first valid pixels, the second valid pixels and the respective remaining valid pixels as a valid pixel group; and
    once all valid pixels for all images spaces are determined and stored as the valid pixel group, receiving and processing, in a graphics pipeline, the valid pixel group thereby reducing the number of computations required.

2. The method of claim 1 wherein defining the first and second image spaces includes defining the first and second image spaces as a subset of a total image to be projected into a three-hundred sixty degree space.

3. The method of claim 2 wherein the projection is an equirectangular projection.

4. The method of claim 2 wherein the defined first image space includes image space in a view of the first image capturing device and the defined second image space includes image space in a view of the second image capturing device.

5. The method of claim 2, further comprising generating a mask that identifies the defined image spaces and excludes from processing pixels in areas of the total image outside the defined image spaces for the respective first or second image devices.

6. The method of claim 1 wherein a boundary of the defined first image space is located in an overlap area between the first image and one or more adjacent images, and a boundary of the defined second image space is located in an overlap area between the second image and one or more adjacent images.

7. The method of claim 6 wherein the boundary is defined by one or more seams formed in the overlap areas where the first image or second image and respective adjacent images are combined during a stitching process.

8. The method of claim 6 wherein analyzing pixels in the first or second image spaces for validity includes determining if the pixel is within the boundary for that image space.

9. The method of claim 6, further comprising storing a pixel within the boundary in the valid pixel group.

10. The method of claim 9, further comprising storing a mirror pixel at the edge of the boundary in the valid pixel group.

11. The apparatus of claim 10 wherein a boundary of the defined first image space is located in an overlap area between the first image and one or more adjacent images, and a boundary of the defined second image space is located in an overlap area between the second image and one or more adjacent images.

12. The apparatus of claim 11 wherein the boundary is defined by one or more seams formed in the overlap areas where the first image or second image and respective adjacent images are combined during a stitching process.

13. The apparatus of claim 11 wherein the computing device determines if the pixel is within the boundary and stores pixels within the boundary in the valid pixel group.

14. The method of claim 6 wherein analyzing pixels in the first or second image spaces for validity includes determining pixels at the edge of the boundary and generating a mirror pixel for each pixel at the edge of the boundary.

15. An apparatus that reduces a number of computations required by a graphics pipeline, comprising:
    a computing device in communication with all image capturing devices of an image capturing system, wherein the computing device receives a first image of a plurality of images captured by a first image capturing device, receives a second image of the plurality of images captured by a second image capturing device, and a respective remaining image of each of the remaining plurality of images captured by each of the remaining respective image capturing devices, the computing device defines a first image space for the first image that is a subset of the first image, defines a second image space for the second image that is a subset of the second image, defines a respective remaining image space for each of the respective remaining images that is a subset of that image, determines first valid pixels by analyzing pixels in the first image space for validity for processing of pixels captured by the first image capturing device, determines second valid pixels by analyzing pixels in the second image space for validity for processing of pixels captured by the second image capturing device, determines respective remaining valid pixels by analyzing pixels in each of the remaining respective image spaces for validity for processing of pixels captured by the respective image capturing devices, stores the first valid pixels, the second valid pixels, and the respective remaining valid pixels as a valid pixel group, and processes, once all valid pixels for all images spaces are determined and stored as the valid pixel group, in a graphics pipeline of the computing device, the valid pixel group thereby reducing the number of computations required.

16. The apparatus of claim 15 wherein the computing device defines the first and second image spaces as a subset of a total image to be projected into a three-hundred sixty degree space.

17. The apparatus of claim 16 wherein the projection is an equirectangular projection.

18. The apparatus of claim 16 wherein the defined first image space includes image space in a view of the first image capturing device and the defined second image space includes image space in a view of the second image capturing device.

19. The apparatus of claim 16, further comprising the computing device generating a mask that identifies the defined image spaces and excludes from processing pixels in areas of the total image outside the defined image spaces for the respective first or second image devices.

20. A non-transitory computer-readable medium that reduces a number of computations required by a graphics pipeline, the non-transitory computer-readable medium having instructions recorded thereon, that when executed by a computing device, cause the computing device to perform operations including:

receiving a first image of a plurality of images, captured by a first image capturing device of a plurality of image capturing devices;

receiving a second image of the plurality of images, captured by a second image capturing device of the plurality of image capturing devices;

receiving a respective remaining image of each of the remaining plurality of images, captured by a respective image capturing device of the plurality of image capturing devices;

defining a first image space for the first image that is a subset of the first image;

defining a second image space for the second image that is a subset of the second image;

defining a respective remaining image space for each of the respective remaining images that is a subset of that image;

determining first valid pixels by analyzing pixels in the first image space for validity for processing of pixels captured by the first image capturing device;

determining second valid pixels by analyzing pixels in the second image space for validity for processing of pixels captured by the second image capturing device;

determining respective remaining valid pixels by analyzing pixels in each of the remaining respective image spaces for validity for processing of pixels captured by the respective image capturing devices;

storing the first valid pixels, the second valid pixels and the respective remaining valid pixels as a valid pixel group; and once all valid pixels for all images spaces are determined and stored as the valid pixel group, receiving and processing, in a graphics pipeline, the valid pixel group thereby reducing the number of computations required.

* * * * *